(12) United States Patent
van den Berghe

(10) Patent No.: US 11,110,860 B2
(45) Date of Patent: Sep. 7, 2021

(54) PREDICTION OF INTENTION OF PATH DEVIANCE FOR VEHICLES

(71) Applicant: FUJITSU LIMITED, Kawasaki (JP)

(72) Inventor: Sven van den Berghe, Marlow Bucks (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/735,908

(22) Filed: Jan. 7, 2020

(65) Prior Publication Data

US 2020/0254929 A1   Aug. 13, 2020

(30) Foreign Application Priority Data

Feb. 13, 2019   (EP) ..................... 19157017

(51) Int. Cl.
*B60Q 9/00* (2006.01)
(52) U.S. Cl.
CPC .................... *B60Q 9/008* (2013.01)
(58) Field of Classification Search
CPC ..................................................... B60Q 9/008
See application file for complete search history.

(56) References Cited

U.S. PATENT DOCUMENTS

| | | | | |
|---|---|---|---|---|
| 9,216,687 B2* | 12/2015 | Huang | ...................... | B60Q 1/40 |
| 9,784,592 B2* | 10/2017 | Gupta | ................ | G01C 21/3697 |
| 10,486,707 B2* | 11/2019 | Zelman | ................... | G08G 1/166 |
| 10,780,888 B2* | 9/2020 | Hunt | .................... | G05D 1/0212 |
| 2016/0180713 A1 | 6/2016 | Bernhardt et al. | | |
| 2017/0016734 A1 | 1/2017 | Gupta et al. | | |
| 2017/0190334 A1 | 7/2017 | Zelman et al. | | |
| 2018/0053108 A1 | 2/2018 | Olabiyi et al. | | |
| 2018/0108254 A1* | 4/2018 | Camacho | .......... | G01C 21/3415 |
| 2020/0158886 A1* | 5/2020 | Segal | .................... | G01S 19/393 |

OTHER PUBLICATIONS

Pin Wang et al.; *"Trajectory Prediction for Turning Vehicles at Intersections by Fusing Vehicle Dynamics and Driver's Future Input Estimation"*; Transportation Research Record: Journal of the Transportation Research Board, No. 2602, Transportation Research Board, Washington D.C., 2016, pp. 68-77. DOI: 10.3141/2602-09; (11 pages).

(Continued)

*Primary Examiner* — K. Wong
(74) *Attorney, Agent, or Firm* — Staas & Halsey LLP

(57) ABSTRACT

A process includes receiving data indicating position and velocity of a vehicle at time points during a time window; using the data to calculate a path of movement by the vehicle; and determining whether the path indicates a change in a direction of movement of the vehicle. When the calculated path indicates a change in the direction, the location of the vehicle at a future time relative to the time window is estimated using the received position and velocity data at end of the time window, and a classification based on a similarity of the calculated path to at least one vehicle path corresponding to a vehicle preparing to turn and to at least one vehicle path corresponding to a vehicle not preparing to turn, and based on the similarity, classifying the calculated path either as that of a vehicle preparing to turn or a vehicle not preparing to turn.

15 Claims, 6 Drawing Sheets

(56) References Cited

OTHER PUBLICATIONS

Ashesh Jain et al.; "*Car that Knows Before You Do: Anticipating Maneuvers via Learning Temporal Driving Models*"; Stanford University, Cornell University, Brain of Things Inc.; 1550-5499/15 2015 IEEE; DOI 10.1109/ICCV.2015.364; 2015 IEEE International Conference on Computer Vision; (9 pages).
Extended European Search Report dated Aug. 29, 2019 in corresponding European Patent Application No. 19157017.5 (6 pages).

* cited by examiner

PREDICTION OF INTENTION OF PATH DEVIANCE FOR VEHICLES

CROSS-REFERENCE TO RELATED APPLICATIONS

This application is based on and hereby claims priority to European Patent Application No. 19157017.5, filed Feb. 13, 2019, in the European Patent Office, the entire content of which is incorporated herein by reference.

FIELD

Embodiments relate to a system and process for prediction of intention of path deviance for vehicles.

BACKGROUND

It is desirable to increase the safety of workers in environments where there are many vehicles moving in arbitrary directions, such as warehouse and construction sites. The ubiquity of wireless communications means that it is now feasible to deliver reliable warnings of possible collisions with vehicles to these workers. These warnings should be created on the basis of accurate predictions of the path of the vehicles. Predicting a path is easy if the vehicles are moving in a straight line, but is more difficult if the vehicles turn during the prediction period.

Many commercial and industrial workplaces contain a mixture of moving vehicles and pedestrians having paths of motion which are, to some extent, arbitrary (i.e. the vehicles and pedestrians are not constrained to move along identified routes or even along lanes). The rules of the road and the safety that arises from these observed conventions are missing in these environments. Consequently systems need to be put in place to ensure the safety of workers. Typically these systems rely on observation by drivers and pedestrians supplemented by visible and audible warnings. Even so, there are areas of particular danger, such as vehicles changing direction to turn corners, particularly in warehouses where the corners are often sharp and blind due to high shelving or stacked goods.

Safety in these workplaces would be enhanced if workers could be specifically informed of imminent potential of collision without broadcasting to unaffected workers. Reducing false or irrelevant alarms will increase the likelihood of action being taken on a warning and avoidance of collision. Such warnings may be delivered to devices held on the person of workers using wireless technologies (phones, wristbands, etc.).

Collision warnings may be created by monitoring the positions and velocities of the vehicles and pedestrians in the workplace and using this data set to predict where the vehicles will be after a certain amount of time and so detect when vehicles are likely to come very close to each other or a pedestrian (and possibly collide).

Path prediction may be simple in some cases. When a vehicle is and remains stationary it is trivial. Similarly, if a vehicle is travelling in a straight line, its future position may be easily calculated using Newton's first law of motion. A less trivial simplification is when vehicles paths are constrained by, for example being on a road, where the future path may be restricted to the constraint, not just a straight line, but following any curves in the constraint.

Serious difficulties in path prediction arise when the vehicles turn, particularly when the future paths are unconstrained. If a turn may be predicted, then this may be input into a path prediction module to select an appropriate prediction algorithm and so predict collisions more accurately and efficiently.

The problem of path prediction for moving vehicles has seen considerable activity, mainly in the context of creating connected and autonomous road vehicles.

Techniques for acquiring location data, velocity data and related situational awareness include using on-board sensors (speed, tyres, etc.), GPS, etc. Inference on these data streams is performed using, amongst others, kinematics, numerical integration, and machine learning (e.g. Kalman filters). These data streams may be augmented by measurements of the environment, passively through video or actively through Light Detection and Ranging (LI DAR).

Without knowledge of driver intention, kinematic principles may only predict vehicle motion by extrapolating current velocity and, possibly, acceleration on the longitudinal and transverse axes over the prediction horizon. This leads to problems with prediction if the future route includes some turning.

Kinematic methods are limited by relying on initial conditions. Some progress may be made by introducing a time element from GPS tracks or extracting vehicle positions from video images and predicting the path from previous paths and recent motion. The resulting time series may be extrapolated to future predictions using Kalman filters, but typically yield usable predictions when the vehicle state is constant for the order of minutes. However, manoeuvres involving turns happen over short timescales, seconds rather than minutes, and Kalman filters are unable to guarantee the required accuracy or timeliness.

Under road driving conditions predictions have been improved by incorporating inferences of the driver's future behaviour—such as knowledge of upcoming road profiles, road curvature etc.—but where the potential paths are not constrained by having defined paths or lanes of travel this information is not available.

SUMMARY

It is desirable to be able to predict, with some suitable margin of advance notice, when a vehicle travelling an unconstrained route will turn.

An embodiment according to a first aspect may provide a vehicle location predictor to predict a location of a vehicle at a predetermined future time. The vehicle may be one of a rear wheel steered vehicle, a front wheel steered vehicle, and an all wheel steered vehicle. The vehicle location predictor may comprise: a data input to receive data indicating position and velocity of the vehicle at a plurality of time points during at least one time window, the position and velocity of the vehicle having been measured independently of one another; a path calculator to calculate a path travelled by the vehicle during the time window, using the received position and velocity data; a path assessor to determine whether the calculated path indicates a change of direction of the vehicle during the time window; and a location estimator to estimate the location of the vehicle at the predetermined future time, using at least the received position and velocity data at the end of the time window. When the calculated path indicates a change of direction, the path assessor classifies the calculated path by determining the similarity of the calculated path to at least one vehicle path corresponding to a vehicle preparing to turn and at least one vehicle path corresponding to a vehicle not preparing to turn, and assigns a classification to the calculated path in accordance with the result of the similarity determination such that the calculated path is classified either as that of a vehicle preparing to turn or a vehicle not preparing to turn. The location estimator estimates the location of the vehicle at the predetermined future time using the classification of the calculated path in addition to the received position and velocity data at the end of the time window. At least one of the position and the velocity of the vehicle may be measured using a sensor placed on the vehicle, for example close to a rear axle.

The invention is predicated on the fact that a driver will usually anticipate a turn and align her/his vehicle for a smooth turn before executing the turn. In this case, the vehicle may undergo significant repositioning before a turn is made. If it is possible to detect this repositioning early enough, then path prediction computations may take the turn into account and deliver more reliable collision warnings.

Thus, embodiments allow fast, accurate differentiation of paths that remain straight from those that will deviate (i.e. turn a corner), thereby enabling better collision prediction. The vehicle location prediction process is simple to apply and has a low computation load, so it may be implemented on low specification hardware while meeting real-time delivery constraints. Embodiments may be most effective in predicting path deviation for rear wheel steered vehicles, since the deviation between the paths of the front and rear of such a vehicle when preparing to turn is more significant, but embodiments may also be successfully applied to predict the path deviation of front wheel steered or all wheel steered vehicles.

At each time point the path calculator may: derive a first estimate of the direction of movement of the vehicle from the received velocity; derive a second estimate of the direction of movement of the vehicle from the received position based on a rate of change of position of the vehicle; and determine a difference between the first and second estimates.

The path assessor may determine that there is no change of direction of the vehicle during the time window when: an average speed value of the vehicle over the time window is zero or less than a threshold speed value close to zero; or there is no difference between the two estimated directions of movement of the vehicle over the time window.

The path assessor may comprise a module to determine if any of the paths indicate the possibility of the vehicle turning in the near future. As discussed above, techniques that rely on kinematic principles may be unsuitable when there is a change in acceleration during the assessment period. A more suitable alternative approach may be to use statistical techniques, such as machine learning, to extract common patterns from the calculated paths and to classify these patterns as paths that may and may not turn in the near future.

The path assessor may therefore comprise a machine learning classifier, using an unsupervised learning classification technique or a supervised learning classification technique, to perform path classification. The machine learning classifier may, for example, comprise an unsupervised learning classification technique, such as a pre-trained K-means classification algorithm, to determine path similarity. For example, one suitable machine learning classifier is the K-means method with Dynamic Time Warping of the computed velocity differences over a period of time (for example, 10 seconds) to provide an estimate of the similarity between path variations.

An embodiment according to a first aspect may provide a vehicle collision warning system comprising: a vehicle location predictor embodying the first aspect to predict the future location of a vehicle; a collision determiner to determine, based on the predicted future location of the vehicle and information on the location of at least one potential obstacle at the predetermined future time, whether a collision involving the vehicle and the obstacle is probable; and a warning device to cause a warning to be issued that a collision with the obstacle is probable when that is the determination of the collision determiner.

An embodiment according to a third aspect may provide a vehicle location prediction process to predict a location of a vehicle at a predetermined future time. The vehicle location prediction process may comprise: receiving data indicating position and velocity of the vehicle at a plurality of time points during at least one time window, the position and velocity of the vehicle having been measured independently of one another; using the received position and velocity data to calculate a path travelled by the vehicle during the time window; determining whether the calculated path indicates a change of direction of the vehicle during the time window; and using at least the received position and velocity data at the end of the time window to estimate the location of the vehicle at the predetermined future time. When it is determined that the calculated path indicates a change of direction, the location of the vehicle at the predetermined future time is estimated using, in addition to the received position and velocity data at the end of the time window, a classification obtained by determining the similarity of the calculated path to at least one vehicle path corresponding to a vehicle preparing to turn and at least one vehicle path corresponding to a vehicle not preparing to turn, and, in accordance with the result of the similarity determination, classifying the calculated path either as that of a vehicle preparing to turn or a vehicle not preparing to turn. At least one of the position and the velocity of the vehicle may be measured using a sensor placed on the vehicle, for example close to a rear axle.

Calculating a path travelled by the vehicle during the time window includes, at each time point: deriving a first estimate of the direction of movement of the vehicle from the received velocity; deriving a second estimate of the direction of movement of the vehicle from the received position based on a rate of change of position of the vehicle; and determining a difference between the first and second estimates.

The process may determine that there is no change of direction of the vehicle during the time window when: an average speed value of the vehicle over the time window is zero or less than a threshold speed value close to zero; or there is no difference between the two estimated directions of movement of the vehicle over the time window.

Determining the similarity of the calculated path may be carried out using a machine learning classifier such as (but not limited to) a classifier comprising a pre-trained K-means classification algorithm.

An embodiment according to a fourth aspect may provide a vehicle collision warning method comprising: carrying out a vehicle location prediction process embodying the third aspect to predict the future location of a vehicle; determining, based on the predicted future location of the vehicle and information on the location of at least one potential obstacle at the predetermined future time, whether a collision involving the vehicle and the obstacle is probable; and causing a warning to be issued that a collision with the obstacle is probable when that is the result of the determining.

An embodiment according to a fifth aspect may provide a non-transitory computer readable medium comprising instructions that, when executed by a computer, cause the computer to carry out a vehicle location prediction process embodying the third aspect or a vehicle collision warning method embodying the fourth aspect.

BRIEF DESCRIPTION OF DRAWINGS

Reference will now be made, by way of example, to the accompanying drawings, in which.

DETAILED DESCRIPTION OF EMBODIMENTS

As mentioned above, embodiments may be applied to predict the path deviance of any rear wheel steered, front wheel steered or all wheel steered vehicle, but are likely to be most effective in predicting path deviation of rear wheel steered vehicles. An explanation will be given below using fork-lift trucks as an example of a rear wheel steered vehicle, but it should be noted that similar embodiments are applicable to predicting the path of any other vehicle based on the typical path characteristics of the vehicle concerned.

As fork-lift trucks steer from their rear wheels they pivot on their front wheels and the rear end will swing wide when turning. Fork-lift truck drivers are taught to take a different turning path from that used by front wheel steered vehicles and also encouraged to ensure that their rear end always swings clear of materials, racks, equipment and pedestrians when rounding corners or manoeuvring in aisles and tight spaces. Fork-lift rear steering wheels may turn at almost 90 degrees, increasing the amount of rear swing of the vehicle.

In order to provide the information necessary to detect rear swing or other vehicle repositioning movements, vehicles must be capable of delivering real time position (i.e. location) and velocity data. These may be derived from many conventional positioning methods, for example GPS (where the accuracy is sufficient) or by using time-of-flight to fixed beacons. The position and velocity measurements must be independent, so dead reckoning is not suitable. Velocity may be obtained from on-board sensors that operate independently from the position sensors, for example if GPS is used to obtain position data then velocity must be derived from a different source such as Doppler computations or time-differenced carrier phase (TDCP). Speed as derived from odometers is not suitable as there is no direction component. The data required may be measured by relatively low-cost sensors that may be easily fitted to existing vehicles. Alternatively, or in addition, it may be possible to reuse existing data sources from one or more sensors already fitted to the vehicles.

Figure 1A:
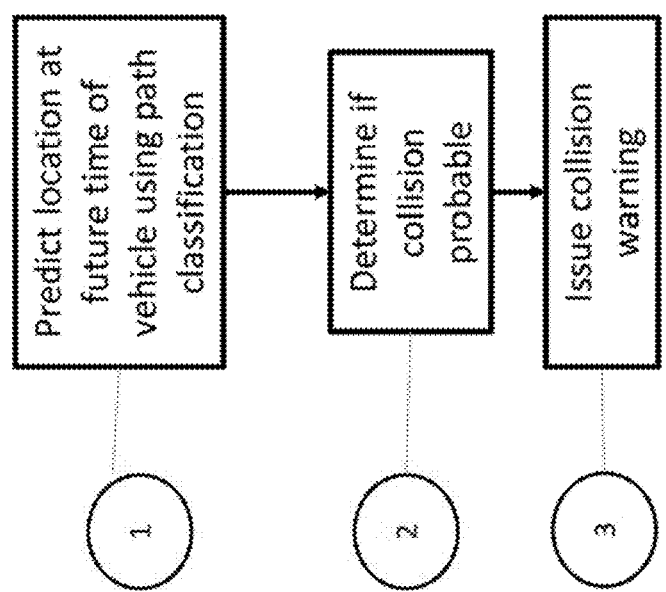
FIG. 1A is a flowchart of a vehicle collision warning method.

As shown in FIG. 1A, operation 1 of a vehicle collision warning method according to an embodiment comprises carrying out a vehicle location prediction process using path classification to predict the future location of a rear wheel steered vehicle. The method further comprises, at operation 2, determining, based on the predicted future location of the vehicle and information on the location of at least one potential obstacle at the predetermined future time, whether a collision involving the vehicle and the obstacle is probable.

At operation 3 of the method, a warning that a collision with the obstacle is probable is caused to be issued when that is the result of the determining. According to an embodiment, the vehicle location prediction process comprises receiving data indicating position and velocity of the vehicle at a plurality of time points during at least one time window, where the position and velocity of the vehicle have been measured independently of one another, and using the received position and velocity data to calculate a path travelled by the vehicle during the time window. The process further comprises determining whether the calculated path indicates a change of direction of the vehicle during the time window, and using at least the received position and velocity data at the end of the time window to estimate the location of the vehicle at the predetermined future time. When it is determined that the calculated path indicates a change of direction, the location of the vehicle at the predetermined future time is estimated using, in addition to the received position and velocity data at the end of the time window, a classification obtained by determining the similarity of the calculated path to at least one vehicle path corresponding to a vehicle preparing to turn and at least one vehicle path corresponding to a vehicle not preparing to turn, and, in accordance with the result of the similarity determination, classifying the calculated path either as that of a vehicle preparing to turn or a vehicle not preparing to turn.

Figure 1B:
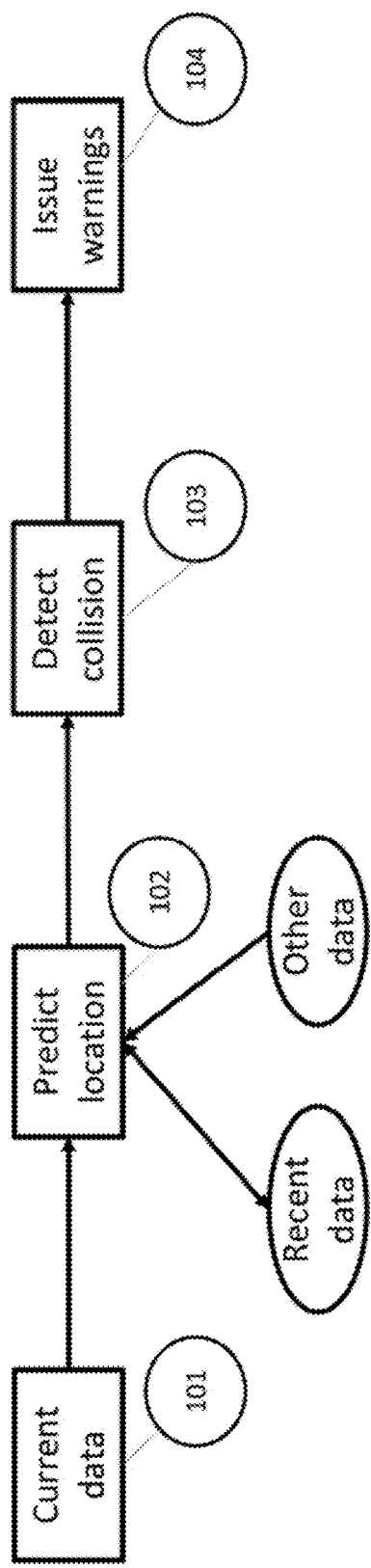
FIG. 1B is a diagram of a vehicle collision warning system.

FIG. 1B shows the high-level flow of data in a collision warning system according to an embodiment. Incoming sensor data, such as vehicle position, velocities, acceleration and any other data relevant to the particular algorithm employed, are acquired for each vehicle in the space under consideration by a data preparation module 101 which cleans the data (i.e. removes noise and other anomalies, and handles missing data, e.g. by interpolating between received data points). The system is therefore robust to poor quality data and missing data.

The cleaned data are passed to a location predictor 102 whose role is to use the incoming data, recent data and any other relevant data to predict where each vehicle will be after the time period of interest to the collision detection system. The location predictor 102 needs to receive only vehicle position and velocity data in order to predict the location of a vehicle. It does not need any environment information (e.g. road/warehouse layout), or steering attitude or other vehicle parameters which may be reported by, for example, location beacons, GPS systems, etc.

The predicted locations for all the vehicles of interest are passed to the collision detector 103 and according to the implemented algorithm those in close proximity are flagged as potential collisions which may be issued as warnings to interested parties by a warning device 104.

Since methods and apparatus for determining the probability of vehicle collisions on the basis of predicted vehicle locations and issuing warnings are well known, the data preparation module 101, the collision detector 103 and the warning device 104 will not be described further. The location predictor 102 will now be discussed in more detail with reference to FIGS. 2A and 2B.

As discussed above, it is desirable to predict the probable location of a vehicle at some future time in the situation that its expected route, and/or the intentions of its driver, are not known. The possible cases to consider are:

The vehicle will not move over the period of interest, so its predicted location will be its current location; or The vehicle will continue at a constant velocity (same speed and direction) and its location may be computed by a simple application of the Newton's first law of motion; or The vehicle will change its current direction; as mentioned above, this is where the main difficulties in collision prediction arise.

The location predictor 102 is configured to perform the classification of the afore-mentioned potential movements of the vehicle, i.e. to flag input paths as stationary, moving in a straight line or turning.

Figure 2A:
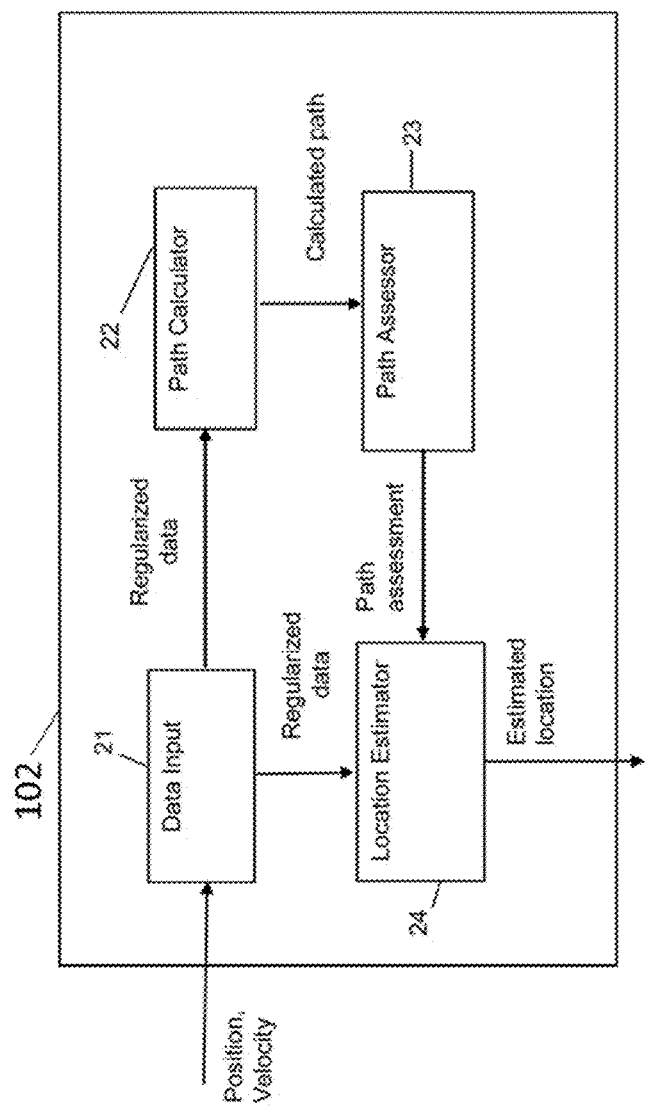
FIG. 2A is a diagram of a vehicle location predictor according to an embodiment.

As shown in FIG. 2A the location predictor 102 comprises a data input 21 to receive data indicating position and velocity of a rear wheel steered vehicle at a plurality of time points during at least one time window, where the position and velocity of the vehicle have been measured independently of one another, a path calculator 22 to calculate a path travelled by the vehicle during the time window using the received position and velocity data, a path assessor 23 to determine whether the calculated path indicates a change of direction of the vehicle during the time window, and a location estimator 24 to predict the location of the vehicle at the predetermined future time using at least the received position and velocity data at the end of the time window. The path assessor 23 is operable, when the calculated path indicates a change of direction, to classify the calculated path by determining the similarity of the calculated path to at least one vehicle path corresponding to a vehicle preparing to turn and at least one vehicle path corresponding to a vehicle not preparing to turn. A classification is assigned to the calculated path in accordance with the result of the similarity determination such that the calculated path is classified either as that of a vehicle preparing to turn or a vehicle not preparing to turn. When the calculated path has been so classified, the location estimator 24 is operable to predict the location of vehicle at the predetermined future time using the classification of the calculated path in addition to the received position and velocity data at the end of the time window.

Position and velocity are conventionally reported to the location predictor 102 in a Cartesian coordinate system. In the case of GPS, latitude and longitude are reported but, at the scale of motion being considered here, these coordinates become effectively Cartesian.

Position=(x,y)
Velocity=(u,v)

where x is the position along one axis, y is the position along a perpendicular axis, u is the rate of change of x with time t and v is the rate of change of y with time t.

Since position and velocity are measured independently, two estimates of the movement of the vehicle may be derived, the first directly from the reported velocity (u,v), and the second (hereafter referred to as "derived velocity") from the rate of change of position (u',v'), that is:

$$\text{Derived Velocity} = (u', v') = \left(\frac{dx}{dt}, \frac{dy}{dt}\right)$$

It is convenient to transform velocities in Cartesian-like coordinates (rate of change of position in perpendicular directions) to polar coordinates (speed and direction of movement), for example:

$$\text{Speed} = s = \sqrt{u^2 + v^2} \quad \text{Speed} = s' = \sqrt{u'^2 + v'^2}$$
$$\text{Direction} = \theta = \tan^{-1}\left(\frac{v}{u}\right) \quad \text{Direction}' = \theta' = \tan^{-1}\left(\frac{v'}{u'}\right)$$

When the vehicle is travelling in a straight line, both estimates of the direction of movement will be the same. However, when the vehicle is turning or preparing to turn, the estimates will differ as the position continues in the actual path of the vehicle while the velocity sensor picks up the rotation due to the rear-end swing, i.e. θ and θ' will differ. Vehicles do not always travel on an entirely straight path, i.e. may vary their direction of travel for short periods, even if not preparing for a turn, so the location predictor 102 is configured to differentiate between paths having future turns and paths that are not anticipated to have a significant turn but which are not entirely straight.

Figure 2B:
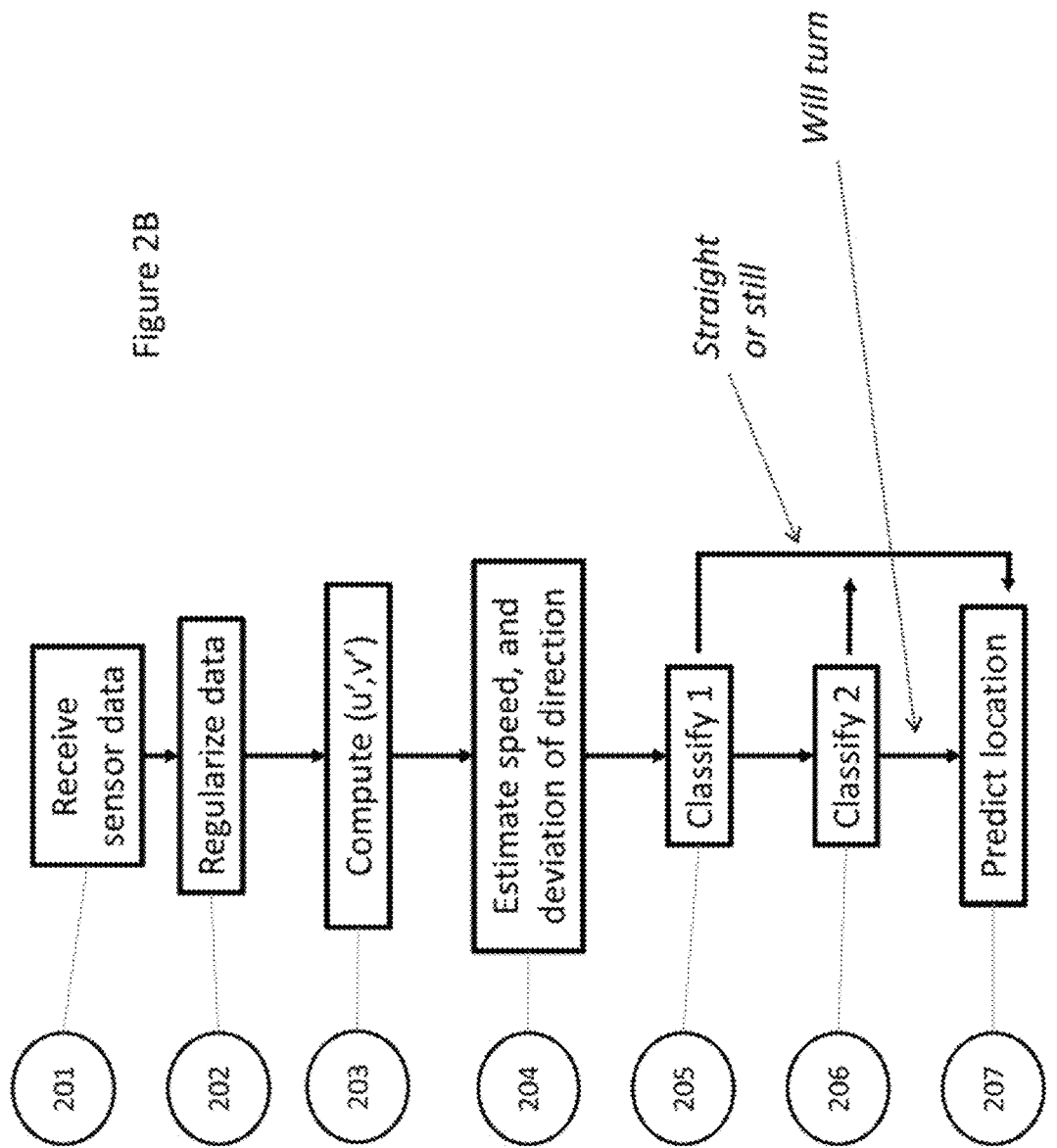
FIG. 2B is a flowchart of a vehicle location prediction process according to an embodiment.

FIG. 2B is a flow chart of the process carried out by the location predictor 102 according to an embodiment. At operation 201 sets of data are received from vehicles which are being monitored. These data sets comprise reports of the current position and velocity of the vehicles. The reports arrive at a sufficiently high frequency as to ensure the final timeliness of collision warnings (depending on the typical speed of the vehicles and latencies introduced by data delivery, processing and alert transmission), for example 10 per second.

As the data may arrive at irregular intervals, at operation 202 the data is "regularized" by, for example, smoothing the reported values over a suitable length of time (e.g. 1 second) and interpolating the results to a regular interval (e.g. every second).

The cleaned (e.g. smoothed and regularised) data is used at operation 203 to calculate the derived velocity (u',v') through numerical differentiation of the sequence of values. For example:

$$(u', v') = \left(\frac{x_a - x_b}{\Delta t}, \frac{y_a - y_b}{\Delta t}\right)$$

where $x_a$, $x_b$ are positions reported at sequential intervals separated by $\Delta t$ seconds. Derived velocity (u',v') is computed for every regularized time.

At operation 204 the reported velocity and the derived velocity are converted to polar coordinates to obtain estimates of the speed s, s' and direction of motion θ, θ' at each time interval, i.e.:

$$\text{Speed} = s = \sqrt{u^2 + v^2} \quad \text{Speed} = s' = \sqrt{u'^2 + v'^2} \text{ and}$$
$$\theta = \tan^{-1}\left(\frac{v}{u}\right) \quad \text{and} \quad \theta' = \tan^{-1}\left(\frac{v'}{u'}\right)$$

and of the absolute value of the deviation in estimates of direction of motion:

Δθ=abs(θ-θ')

(since it is the possibility of a change in direction of the vehicle that is being determined here, not the direction of the turn or its magnitude, it is appropriate to use the absolute value).

The resulting data is stored in a sliding buffer/window of an appropriate length, say 10 seconds, which is passed in its entirety to the next operation of the process at regular intervals, e.g. 1 second (that is, one 10 second buffer is passed to the next operation every 1 second).

In a first classification operation, operation 205, the path assessor 23 of the location predictor 102 detects which of the received windows do not indicate any change of direction over the window length. In a first case to be detected there is no motion over the time window length, which is indicated for example by the average speed being zero or less than a threshold close to zero. In a second case to be detected the vehicle is moving in a straight line for the whole time window length and is therefore unlikely to be preparing for a turn. One technique to detect windows which do not indicate any change of direction is to select those windows whose average deviation is below a threshold. The windows which are determined to represent straight line motion or a stationary vehicle are passed directly to the location estimator 24 at operation 207, which then predicts the future location of the vehicle in accordance with case (1) or (2) above. All other windows are processed in a second classification operation, operation 206, in which the location predictor seeks to detect which of the windows indicate the possibility of a turn commencing or continuing in a period after the end of the input window.

A number of different classification methods may be used, but one proposed implementation of the second classification operation uses a machine learning (ML) classifier. For example, it is possible to use a pre-trained K-means classification algorithm using Dynamic Time Warping as the measure of distance (i.e. similarity) between two time windows.

Figure 3:
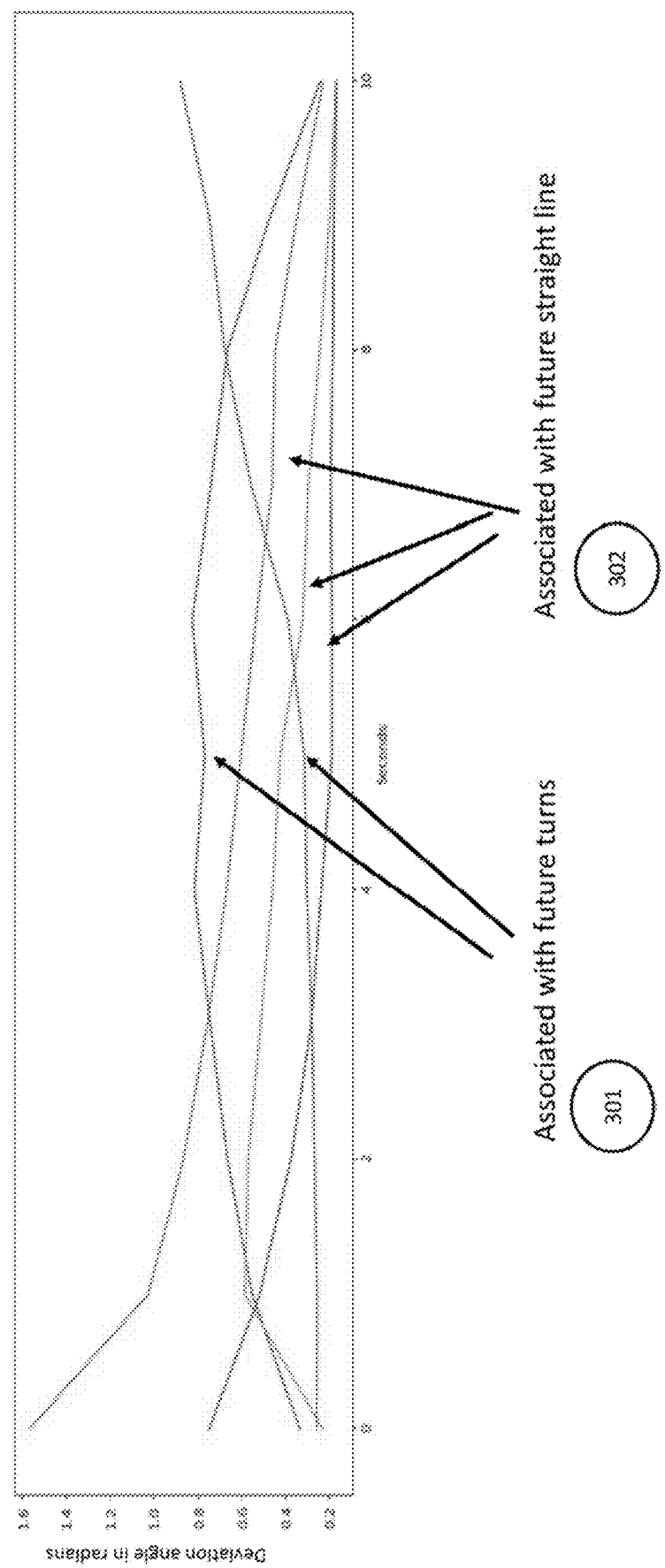
FIG. 3 is a graph showing path deviations over time.

In particular, prior to use by the location predictor 102, the K-means algorithm is trained using training data corresponding to a plurality (e.g. 5) of different classes of vehicle motion, some of which are associated with a vehicle preparing to make a turn and others of which are associated with a vehicle continuing more or less in a straight line. As illustrated in FIG. 3, which is a plot of the deviation $\Delta\theta$ against time for five different paths, in execution of the algorithm the time windows of one or more of the vehicles (indicated as 301 in FIG. 3) may be classified into a class associated with vehicles turning after a certain interval beyond the end of each time window, in which case they are marked as "turning". The others are marked as "not-turning" (indicated as 302 in FIG. 3) and treated as corresponding to vehicles travelling in a straight line (with direction computed from the direction values in the current time window).

Where the sensors are placed on the vehicle will influence the efficacy of the location predictor 102. The difference in apparent direction of motion from the two measurements will be exaggerated the closer the sensor is placed to the rear axle of the vehicle.

An alternative technique to obtain two independent measurements of velocity for use by the location predictor 102 is to install two position-only sensors on the vehicle, one placed toward the front of the vehicle and the other placed towards the rear. However, estimation of the two directions of motion $\theta$, $\theta'$ is the same as described above.

Similarly, two velocity-only sensors (or a combination of velocity and position sensors) may be employed to obtain the necessary independent velocity measurements, provided that the two sensors are placed at opposite ends of the vehicle.

Embodiments may be used to avoid collisions in any area where vehicles are being used, especially in unconstrained spaces, including but not limited to warehouses, ports (container movements), construction sites, and airside of airports, where possible vehicle paths are not completely fixed (i.e. vehicle movement is not constrained to roads or lanes).

Figure 4:
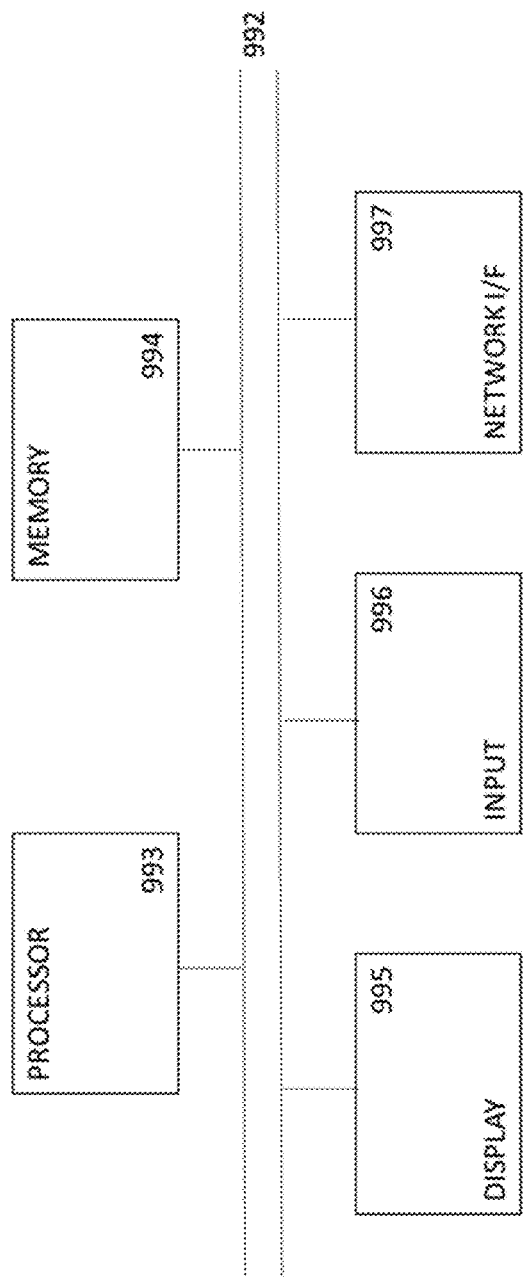
FIG. 4 is a block diagram of a computing device suitable for carrying out a method according to an embodiment.

FIG. 4 is a block diagram of a computing device, such as a data storage server, which embodies the present invention, and which may be used to implement some or all of the operations of a method embodying the present invention, and perform some or all of the tasks of apparatus of an embodiment. For example, the computing device of FIG. 4 may be used to implement all the operations of the vehicle collision warning method illustrated in FIG. 1A and perform all the tasks of the vehicle collision warning system shown in FIG. 1B, or only to implement the vehicle location prediction process of FIG. 2B and only to perform the tasks of the vehicle location predictor 102 in FIG. 2A.

The computing device comprises a processor 993, and memory, 994. Optionally, the computing device also includes a network interface 997 for communication with other such computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer-readable storage medium, for example to store at least one program to be executed by processor 993 to carry out the process/tasks of FIGS. 1A, 1B, 2A and/or 2B. The term "computer-readable storage medium" may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1A and/or 2B and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device and may also display a cursor and dialog boxes and screens enabling interaction between a user and the programs and data stored on the computing device. For example, the display unit 995 may display the multivariate data to be imagified and the resulting images. The input mechanisms 996 may enable a user to input data, such as the multivariate data to be imagified, and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackerball, etc. may be included in the computing device.

Methods embodying the present invention may be carried out on a computing device such as that illustrated in FIG. 4. Such a computing device need not have every component illustrated in FIG. 4, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

The invention claimed is:

1. An apparatus to estimate a location of a vehicle, the apparatus comprising:
    a processor to couple to a memory and to implement,
        a data input to receive data indicating position and velocity of the vehicle at a plurality of time points during a time window, the position and velocity of the vehicle having been measured independently of one another;
        a path calculator to calculate a path of movement by the vehicle during the time window, using the received position and velocity data;
        a path assessor to determine whether the calculated path indicates a change in a direction of the movement of the vehicle during the time window; and
        a location estimator to estimate the location of the vehicle at a determined future time relative to the time window, using at least the received position and velocity data at end of the time window;
    wherein when the calculated path indicates a change in the direction of movement of the vehicle,
        the path assessor
            classifies the calculated path by determining a similarity of the calculated path to at least one vehicle path corresponding to a vehicle preparing to turn and at least one vehicle path corresponding to a vehicle not preparing to turn, and
            assigns a classification to the calculated path in accordance with a result of the similarity determination such that the calculated path is classified as that of a vehicle which path indicates a change in the direction as preparing to turn, or a vehicle which path indicates not a change in the direction as not preparing to turn; and
        the location estimator estimates the location of the vehicle at the determined future time using the classification of the calculated path in addition to the received position and velocity data at the end of the time window.

2. The apparatus as claimed in claim 1, wherein at each time point among the plurality of time points, the path calculator:
    derives a first estimate of the direction of movement of the vehicle from the received velocity;
    derives a second estimate of the direction of movement of the vehicle from the received position based on a rate of change of position of the vehicle; and
    determines a difference between the first and second estimates based upon which difference the path is calculated.

3. The apparatus as claimed in claim 2, wherein the path assessor determines that there is no change in the direction of movement of the vehicle during the time window when:
    an average speed value of the vehicle over the time window is zero or less than a threshold speed value close to zero; or
    there is no difference between the two estimated directions of movement of the vehicle over the time window.

4. The apparatus as claimed in claim 1, wherein the path assessor comprises a machine learning classifier.

5. The apparatus as claimed in claim 4, wherein the machine learning classifier comprises a pre-trained K-means classification algorithm to determine similarity.

6. The apparatus as claimed in claim 1, wherein any one or a combination of the position or the velocity of the vehicle is measured using a sensor placed on the vehicle close to a rear axle.

7. A vehicle collision warning system comprising:
    an apparatus as claimed in claim 1 to estimate a location of a vehicle;
    a collision determining device to determine, based on the estimated location of the vehicle and information on the location of at least one potential obstacle at the determined future time, whether a collision involving the vehicle and the obstacle is probable; and
    a warning device to cause a warning to be issued that a collision with the obstacle is determined by the collision determining device to be probable.

8. A process by an apparatus to estimate a location of a vehicle, the process comprising:
    receiving data indicating position and velocity of the vehicle at a plurality of time points during at least one time window, the position and velocity of the vehicle having been measured independently of one another;
    using the received position and velocity data to calculate a path of movement by the vehicle during the time window;
    determining whether the calculated path indicates a change in a direction of the movement of the vehicle during the time window; and
    using at least the received position and velocity data at end of the time window to estimate the location of the vehicle at the determined future time relative to the time window;
    wherein, when determined that the calculated path indicates a change in the direction of movement of the vehicle, estimating the location of the vehicle at the determined future time based upon
the received position and velocity data at the end of the time window, and
a classification obtained by
determining a similarity of the calculated path to at least one vehicle path corresponding to a vehicle preparing to turn and at least one vehicle path corresponding to a vehicle not preparing to turn, and,
in accordance with a result of the similarity determination, classifying the calculated path as that of a vehicle which path indicates a change in the direction as preparing to turn, or a vehicle which path indicates not a change in the direction as not preparing to turn.

9. The process as claimed in claim 8, wherein the calculating the path of the vehicle during the time window includes, at each time point among the plurality of time points:
deriving a first estimate of the direction of movement of the vehicle from the received velocity;
deriving a second estimate of the direction of movement of the vehicle from the received position based on a rate of change of position of the vehicle; and
determining a difference between the first and second estimates based upon which difference the path is calculated.

10. The process as claimed in claim 9, comprising determining that there is no change in the direction of movement of the vehicle during the time window when:

an average speed value of the vehicle over the time window is zero or less than a threshold speed value close to zero; or
there is no difference between the two estimated directions of movement of the vehicle over the time window.

11. The process as claimed in claim 8, wherein the determining the similarity of the calculated path is carried out using a machine learning classifier.

12. The process as claimed in claim 11, wherein the machine learning classifier comprises a pre-trained K-means classification algorithm.

13. The process as claimed in claim 8, wherein any one or a combination of the position or the velocity of the vehicle is measured using a sensor placed on the vehicle close to a rear axle.

14. A vehicle collision warning method comprising:
carrying out a vehicle location estimation process as claimed in claim 8 to estimate a location of a vehicle;
determining, based on the estimated location of the vehicle and information on the location of at least one potential obstacle at the determined future time, whether a collision involving the vehicle and the obstacle is probable; and
causing a warning to be issued that a collision with the obstacle is determined by the collision determining device to be probable.

15. A non-transitory computer readable medium comprising instructions that, when executed by a computer, cause the computer to carry out the vehicle location estimation process of claim 8.

* * * * *